United States Patent [19]
Dean et al.

[11] Patent Number: 5,011,869
[45] Date of Patent: Apr. 30, 1991

[54] SELF-LEVELING SILICONE SEALANT COMPOSITIONS AND METHODS FOR MAKING SAME

[75] Inventors: John W. Dean, Guilderland, N.Y.; Melvin D. Beers, Hudson, Ohio

[73] Assignee: General Electric Company, Waterford, N.Y.

[21] Appl. No.: 401,527

[22] Filed: Aug. 29, 1989

Related U.S. Application Data

[63] Continuation of Ser. No. 154,479, Feb. 8, 1988, abandoned, which is a continuation of Ser. No. 716,073, Mar. 26, 1985, abandoned.

[51] Int. Cl.$^5$ ............................................. C08K 5/17
[52] U.S. Cl. ................................. 523/213; 524/714; 524/860; 525/477; 528/14; 528/15; 528/18; 528/34
[58] Field of Search ............... 523/212, 213; 524/714, 524/860; 528/21, 33, 14, 18, 34, 15; 525/477

[56] References Cited

U.S. PATENT DOCUMENTS 3,649,588  3/1972  Skipton et al. ..................... 523/212

*Primary Examiner*—John C. Bleutge
*Assistant Examiner*—R. Dean, Jr.
*Attorney, Agent, or Firm*—Gary L. Loser

[57] ABSTRACT

There is provided a self-leveling silicone composition comprising
(a) an acyloxy-terminated polydiorganosiloxane,
(b) an effective amount of condensation catalyst, and
(c) an amount of amine effective for rendering said composition self-leveling.

33 Claims, No Drawings

SELF-LEVELING SILICONE SEALANT COMPOSITIONS AND METHODS FOR MAKING SAME

This application is a continuation of application Ser. No. 07/154,479, filed Feb. 2, 1988, now abandoned, which is a continuation of application Ser. No. 716,073, filed Mar. 26, 1985, now abandoned.

BACKGROUND OF THE INVENTION

The present invention relates to self-leveling silicone sealant compositions and methods for making such compositions. More particularly, the present invention relates to one component, acyloxy-functional, room temperature vulcanizable (RTV) silicone compositions which incorporate therein, as a self-leveling agent, an amine such as, for example, n-hexylamine.

In many applications, it is desirable to utilize a self-leveling silicone sealant composition. Traditionally, self-leveling, one component silicone RTV's are manufactured using untreated fumed silica fillers. The manufacturing process for producing these self-leveling compositions requires extremely high shear mixing conditions as well as elevated temperatures for effecting the mixing.

Accordingly, it would be highly desirable to provide self-leveling, one component silicone RTV's which can use both treated and untreated silica fillers and eliminates the need for high shear mixing at elevated temperatures in their manufacture.

Bruner, U.S. Pat. No. 3,035,016, discloses room temperature vulcanizable silicone compositions of the formula

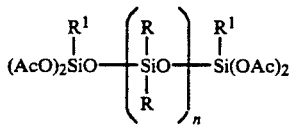

where Ac is a saturated aliphatic monoacyl radical of a carboxylic acid, R and $R^1$ are selected from the group consisting of monovalent hydrocarbon radicals, halogenated monovalent hydrocarbon radicals and cyanoalkyl radicals, and n is an integer of at least five. The acyloxy-functional polysiloxane is prepared by reacting acyloxy silanes of the formula $R^1Si(OAc)_3$, with hydroxylated siloxanes of the formula

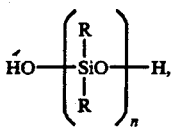

where R and $R^1$ are as previously defined.

Bruner, U. S. Pat. No. 3,077,465, teaches that the room temperature vulcanizable composition described in U.S. Pat. No. 3,035,016 can be made to cure more effectively by including therein from 0.001 to 10 percent by weight of a carboxylic acid salt of a metal ranging from lead to manganese, inclusive, in the electromotive series of metals.

Ceyzeriat, U.S. Pat. No. 3,133,891, relates to room temperature vulcanizable compositions which comprise a linear diorganopolysiloxane consisting of units of the formula $R_2SiO$, in which each R represents a monovalent radical selected from the group consisting of halogenated and halogenfree aliphatic, alicyclic and aromatic hydrocarbon radicals and containing at least 0.1 weight percent hydroxyl groups and 0.5 to 25 weight percent, based on the diorganopolysiloxane, of an organotriacyloxysilane of the formula $R^1Si(OCOR^2)_3$, where $R^1$ is a monovalent radical selected from the group consisting of lower alkyl, alkenyl, aryl and aralkyl radicals and $R^2$ is a monovalent radical selected from the group consisting of alkyl radicals having 1 to 18 carbon atoms and aryl radicals.

Kulpa, U.S. Pat. No. 3,296,161, describes a silicone composition comprising an organopolysiloxane having a viscosity of from about 200 to 500,000 centipoise at 25° C., and containing from 0.02 to 2% silicon-bonded hydroxyl groups; and from 0.2 to 6 parts per 100 parts of said organopolysiloxane of a dialkoxydiacyloxysilane and from 1.8 to 6 parts of an organotriacyloxysilane.

Goossens, U.S. Pat. No. 3,296,195, discloses a silicone RTV composition comprising a silanol chainstopped polydiorganosiloxane, and an alkoxyacyloxysilane wherein the four valences of silicon are satisfied by either zero or one silicon-bonded radical selected from monovalent hydrocarbon radicals, halogenated monovalent hydrocarbon radicals and cyanoalkyl radicals, at least one radical selected from alkoxy radicals and halogenated alkoxy radicals, and at least one saturated aliphatic monoacyl radical.

Beers, U.S. Pat. No. 3,382,205, provides a substantially anhydrous organopolysiloxane composition curable at room temperatures to the elastomeric state upon exposure to moisture comprising (A) 100 parts of a silanol terminated organopolysiloxane consisting essentially of chemically combined diorganosiloxy units of the formula $R_2SiO$; (B) 2 to 20 parts of a curing agent of the formula $RSi(OCOR^1)_3$; and (C) 2 to 30 parts of an organosilicon process aid composed of diorganosiloxy units of (A) chemically combined with organosiloxy units of the formula $RSiO_{1.5}$ and triorganosiloxy units of the formula $R_3SiO_{0.5}$; where the organosilicon process aid has from 0.1 to 8 weight percent hydroxy radicals attached to silicon, a ratio of organosiloxy units to diorganosiloxy units of 0.11 to 1.4 and a ratio of triorganosiloxy units to diorganosiloxy units of 0.02 to 1.

Nowhere, however, do any of these references disclose or suggest the inclusion of an amine in order to make the curable compositions self-leveling rather than thixotropic.

All of the foregoing patents are hereby incorporated by reference into the instant disclosure in their entireties for their teachings directed to acyloxy-functional silicone compositions.

SUMMARY OF THE INVENTION

It is an object of the present invention to provide self-leveling organopolysiloxane compositions which are curable to the elastomeric state upon exposure to moisture.

It is another object of the present invention to provide methods for making self-leveling silicone RTV compositions wherein high shear mixing at elevated temperatures is not necessary.

Still another object of the present invention is self-leveling silicone compositions which can employ both treated and untreated silica fillers.

In accordance with one aspect of the present invention the foregoing objects are accomplished with a one component organopolysiloxane composition comprising:

(a) an acyloxy-terminated polydiorganosiloxane,
(b) an effective amount of condensation catalyst, and
(c) an amount of amine effective for rendering said composition self-leveling.

In another aspect of the present invention there is provided a self-leveling silicone RTV composition comprising:

(a) a silanol-terminated polydiorganosiloxane,
(b) at least about one mole of polyacyloxysilane per mole of silicon-bonded hydroxyl groups in (a),
(c) an effective amount of condensation catalyst, and
(d) an amount of amine effective for rendering said composition self-leveling.

Preferably, the room temperature vulcanizable compositions of the present invention also include a reinforcing filler such as treated or untreated fumed silica. Further, other additives well known in the art can optionally be included in the compositions of the present invention.

DESCRIPTION OF THE INVENTION

There is provided by the present invention a self-leveling, one component, room temperature vulcanizable silicone composition curable to the elastomeric state upon exposure to moisture, comprising:

(a) an acyloxy-terminated polydiorganosiloxane,
(b) an effective amount of condensation catalyst, and
(c) an amount of amine effective for rendering said composition self-leveling.

Acyloxy-terminated polydiorganosiloxane (a) preferably has the general formula

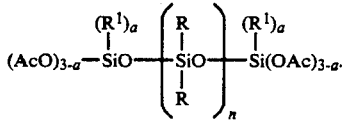

I wherein Ac is a saturated aliphatic monoacyl radical, R and $R^1$ are independently selected from the group consisting of monovalent hydrocarbon radicals, halogenated monovalent hydrocarbon radicals and cyanoalkyl radicals, n is an integer of at least 5, and a equals 0 or 1.

The acyloxy-terminated polydiorganosiloxane of formula I is prepared by reacting a polyacyloxysilane of the formula.

II where $R^1$, a and Ac are as previously defined, with a silanol terminated polydiorganosiloxane of the formula

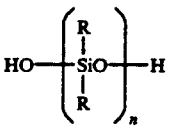

where R and n are as previously defined. Because reaction between the acyloxy silane and hydroxyl terminated polydiorganosiloxane is believed to occur upon mixing the two, it is possible to utilize compounds of formula II and formula III in place of the acyloxy-terminated polymer of formula I.

In formulas I and II, Ac is a saturated aliphatic monoacyl radical of a carboxylic acid. Illustrative of the preferred radicals are those in which the acyl radical contains up to D four carbon atoms such as formyl, acetyl, proprionyl and butyryl radicals. However, the acyl groups can also be groups such as, for example, hexoyl, 2-ethyl hexoyl, octanoyl, isovaleryl, stearyl and the like. Most preferably, Ac is an acetyl radical, and hence the curable composition is referred to in the art as an acetoxy sealant. $R^1$ can be any monovalent hydrocarbon radical, for example, an alkyl radical such as methyl, ethyl, propyl or octadecyl; an alkenyl radical such as vinyl, allyl or hexenyl; a cycloaliphatic radical such as cyclopentyl, cyclohexyl or cyclohexenyl; an alkaryl radical such as benzyl or B-phenylethyl; or an aromatic radical such as phenyl, tolyl, xylyl, naphthyl, xenyl or phenanthryl. $R^1$ can also be any halogenated monovalent hydrocarbon radical such as chloromethyl, pentaflurobutyl, trifluoropropyl, chlorophenyl, bromoxenyl, chlorotrifluorocyclobutyl, iodophenyl and the like. In addition, $R^1$ can be any cyanoalkyl radical such as beta-cyanoethyl, gamma-cyanopropyl, omega-cyanobutyl, beta-cyanopropyl, gamma-cyanobutyl and the like. Preferably $R^1$ is methyl.

In formula III, R can be any of the radicals previously identified for $R^1$ and preferably is methyl. Preferably, the value of n is sufficient to provide a viscosity at 25° C. which ranges from about 100 centipoise to about 500,000 centipoise. More preferably the viscosity ranges from about 2500 centipoise to about 100,000 centipoise at 25° C. and, most preferably, ranges from about 10,000 centipoise to about 50,000 centipoise at 25° C.

It should be understood that for the purposes of this invention mixtures of compounds can be employed, that different type acyl groups can be present in one or more molecules, and that various R and $R^1$ groups can be present in any molecule or mixture of molecules. In short, single acyloxysilanes can be employed or mixtures of two or more different acyloxysilanes can be employed. Also, it should be understood that the hydroxylated polysiloxane can be a homopolymer or it can be a copolymer of two or more different siloxane units. It should also be understood that mixtures of two or more hydroxylated siloxanes can be employed in preparing the polysiloxane of formula I.

The preparation of acyloxy-terminated polydiorganosiloxanes of formula I from acyloxysilanes of formula II and silanol terminated polydiorganosiloxanes of formula III is well known in the art and is described, for example, in U.S. Pat. No. 3,035,016.

Condensation catalysts suitable for use in practicing the present invention include, for example, carboxylic acid salts of a metal ranging from lead to manganese, inclusive, in the electromotive series of metals. Specifically, the metals included are lead, tin, nickel, cobalt, iron, cadmium, chromium, zinc and manganese. Most preferably tin salts are employed in the practice of the present invention. The carboxylic acids employed in the preparation of the salts of this component can be monocarboxylic acids or dicarboxylic acids.

Specific examples of salts which are operative in this invention are lead naphthenate, cobalt naphthenate, iron-2-ethylhexoate, lead 2-ethylhexoate, chromium octoate and lead sebacate. Examples of the preferred tin salts include carbomethoxyphenyltintrisuberate, isobutyltintricerotate, dimethyltindibutyrate, dibutyltindiacetate and dibutyltindilaurate.

The amount of metal salt of the organic carboxylic acid which can be employed in the practice of the present invention is a function of the increased rate of curing desired. In general, no particular benefit is derived from employing more than about 5% by weight of such metal salt based on the weight of organopolysiloxane base polymer. Preferably, such metal salt is present in an amount of from about 0.01 percent by weight to about 2.0 percent by weight, based on the weight of the base polymer.

Other condensation catalysts are well known in the art, for example, tin oxide, zirconium octoate, antimony octoate, and their suitability for practicing the present invention is readily ascertainable by the artisan without undue experimentation.

The novel aspect of the present invention resides in the quite unexpected discovery that the presence of small quantities of organic amine in prior art acyloxy-functional silicone RTV compositions renders such compositions self-leveling. The amine used in practicing the present invention can be a primary amine, secondary amine or tertiary amine, or a mixture thereof. Preferably the amine is a primary or secondary amine and most preferably is a secondary amine.

Examples of operative amines include methylamine, ethylamine, hexylamine, dimethylamine, diethylamine, dihexylamine, trimethylamine, triethylamine, ethylenediamine, propylenediamine, aniline, N-methylaniline, ethanolamine, diphenylamine, and the like. Other amines suitable for use in practicing the present invention can be determined by the artisan without undue experimentation. The most preferred amine is di-n-hexylamine.

For purposes of the present invention the term "amine" includes guidelines of the formula

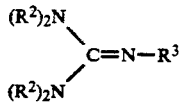

where $R^2$ are independently selected from hydrogen and alkyl radicals having from 1 to 8 carbon atoms, and $R^3$ is an alkyl radical having from 1 to 8 carbon atoms.

The amount of amine effective for imparting self-leveling to the compositions of this invention generally is greater than about 25 parts per million; preferably is greater than about 40 parts per million; and most preferably is greater than about 75 parts per million based on the weight of the polydiorganosiloxane component. No particular benefit is derived from employing more than about 1 percent by weight based on the polydiorganosiloxane component. Particularly effective results have been obtained when the amine is utilized in an amount of from about 100 parts per million to about 200 parts per million based on the polydiorganosiloxane component. Accordingly, the preferred range of amine for imparting self-leveling to the composition of the present invention is from about 25 ppm to about 200 ppm based on the polydiorganosiloxane.

Preferably, compositions of the present invention further include any of the well known reinforcing fillers such as fumed silica, silica aerogel or precipitated silica. Such reinforcing fillers may also be treated according to methods well known in the art, for example, with cyclopolysiloxanes as disclosed in U.S. Pat. No. 2,938,009 or with silazanes as disclosed in U.S. Pat. No. 3,635,743. Preferably, there is utilized untreated or treated fumed silica.

In addition to such reinforcing fillers it is often desirable to further include extending fillers such as coarse silicas such as diatomaceous earth and crushed quartz, metal oxides such as ferric oxide and zinc oxide, asbestos, and the like. In short, any of the fillers commonly employed with silicone rubbers may be employed in the compositions of this invention.

The amounts of filler used can be varied within wide limits in accordance with the intended use of the curable composition. For example, in some sealant applications, the curable compositions of the present invention can be used free of filler. In other applications, such as the employment of the curable compositions for making binding material, as much as 700 parts by weight filler per 100 parts by weight polydiorganosiloxane can be employed.

The compositions of the present invention also can be employed as construction sealants and caulking compounds. The exact amount of filler, therefore, will depend upon such factors as the application for which the composition is intended, the type of filler utilized (that is, the density of the filler and its particle size). Preferably, a proportion of from 10 to 300 parts by weight filler, which can include up to about 35 parts reinforcing filler per 100 parts by weight polydiorganosiloxane is utilized.

In addition to the foregoing ingredients the compositions of this invention may include any other desirable additive such as pigments, sun-screen agents, oxidation inhibitors, plasticizers, flame retardants and the like.

The compositions of the present invention are prepared simply by mixing the various components in the substantial absence of moisture. However, for ease of manufacturing, it is often convenient to form a blend or mixture of all the components of the composition except the acyloxysilane, to then remove moisture from the resulting mixture by maintaining the mixture under vacuum, and thereafter to add the acyloxysilane prior to packaging the compositions in containers protected from moisture.

The following examples are illustrative of the practice of the invention and are not intended to be limiting in any manner. All parts are by weight unless otherwise noted.

EXAMPLES

The following base compounds were prepared:
(1) 100 parts silanol terminated polydimethylsiloxane (18,000 cps.)
(2) methyldimethoxysiloxy terminated polydimethylsiloxane containing 0.5 weight percent dihexylamine as set forth in Table I.
(3) 15 parts M, D, T-OH fluid as described in U.S. Pat. No. 3,382,205.
(4) 20 parts methyltetramer treated fumed silica having a surface area of 200 m²/gm.

TABLE I

| Exp. # | Wt % (2) in Base Compound | Calculated ppm Dihexylamine |
|---|---|---|
| 1 | 5.0 | 200 |
| 2 | 2.0 | 100 |
| 3 | 0.5 | 25 |
| 4 | 0.1 | 5 |

TABLE I-continued

| Exp. # | Wt % (2) in Base Compound | Calculated ppm Dihexylamine |
|---|---|---|
| 5 | — | 100 (added directly) |

To each of the foregoing base compounds there was added 4.2 parts of a mixture comprising 79.5 weight percent methyltriacetoxysilane, 19.9 weight percent di-t-butoxydiacetoxysilane and 0.6 weight percent dibutyltindilaurate.

The rheological properties of the sealants were determined on a vertical Boeing flow jig and were found to flow at the rates set forth in Table II.

TABLE II

| Exp. # | Flow Rate (1) |
|---|---|
| 1 | 82 |
| 2 | 79 |
| 3 | — (2) |
| 4 | — (3) |
| 5 | 82 |

(1) seconds to flow four inches
(2) flowed 0.4 inch in three minutes
(3) flowed less than 0.1 inch in three minutes

We claim:

1. A self-leveling, curable composition, consisting essentially of:
   (a) an acyloxy-terminated polydiorganosiloxane,
   (b) an effective amount of metal-containing condensation catalyst,
   (c) from about 25 parts per million to about 200 parts per million of dihexylamine, and
   (d) sufficient fumed silica treated with cyclopolysiloxanes or silazanes to provide reinforcement.

2. The composition of claim 1, wherein the acyloxy-terminated polydiorganosiloxane has the general formula

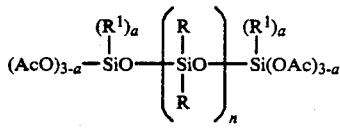

wherein Ac is a saturated aliphatic monoacyl radical, R and R¹ are independently selected from the group consisting of monovalent hydrocarbon radicals, halogenated monovalent hydrocarbon radicals and cyanoalkyl radicals, n is an integer of at least 5, and a equals 0 or 1.

3. The composition of claim 2, wherein the acyloxy-terminated polydiorganosiloxane has a viscosity of from about 100 centipoise to about 500,000 centipoise at 25° C.

4. The composition of claim 2, wherein the acyloxy-terminated polydiorganosiloxane has a viscosity of from about 2500 centipoise to about 100,000 centipoise at 25° C.

5. The composition of claim 2, wherein the acyloxy-terminated polydiorganosiloxane has a viscosity of from about 10,000 centipoise to about 50,000 centipoise at 25° C.

6. The composition of claim 1, wherein the condensation catalyst is a carboxylic acid salt of a metal selected from the group consisting of lead, tin, nickel, cobalt, iron, cadium, chromium, zinc and manganese.

7. The composition of claim 6 wherein the metal is tin.

8. The composition of claim 6 wherein the condensation catalyst is present in an amount of from about 0.01 percent by weight to about 2.0 percent by weight, based on the weight of acyloxy-terminated polydiorganosiloxane.

9. The composition of claim 1 wherein the amine is present in an amount greater than about 40 parts per million, based on the weight of acyloxy-terminated polydiorganosiloxane.

10. The composition of claim 1, wherein the amine is present in an amount greater than about 75 parts per million, based on the weight of acyloxy-terminated polydiorganosiloxane.

11. The composition of claim 1 wherein the amine is present in an amount of from about 100 parts per million to about 200 parts per million, based on the weight of acyloxyterminated polydiorganosiloxane.

12. A method for making a self-leveling, curable composition, consisting essentially of
   I. anhydrously mixing
   (a) an acyloxy-terminated polydiorganosiloxane,
   (b) an effective amount of a metal-containing condensation catalyst,
   (c) from about 25 parts per million to about 200 parts per million of dihexylamine, and
   (d) sufficient fumed silica treated with cyclopolysiloxanes or silazanes to provide reinforcement.

13. The method of claim 23 wherein the acyloxy-terminated polydiorganosiloxane has the general formula

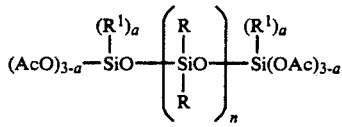

wherein Ac is a saturated monoacyl radical, R and R¹ are independently selected from the group consisting of monovalent hydrocarbon radicals, halogenated monovalent hydrocarbon radicals and cyanoalkyl radicals, n is an integer of at least 5, and a equals 0 or 1.

14. The method of claim 13 wherein the acyloxy-terminated polydiorganosiloxane has a viscosity of from about 100 centipoise to about 500,000 centipoise at 25° C.

15. The method of claim 12 wherein the amine is present in an amount greater than about 40 parts per million, based on the weight of acyloxy-terminated polydiorganosiloxane.

16. The method of claim 12 wherein the amine is present in an amount greater than about 75 parts per million, based on the weight of acyloxy-terminated polydiorganosiloxane.

17. A self-leveling, curable composition, consisting essentially of:
   (a) a silanol-terminated polydiorganosiloxane,
   (b) at least about one mole of polyacyloxysilane per mole of silicon-bonded hydroxyl groups in (a);
   (c) an effective amount of metal-containing condensation catalyst,
   (d) from about 25 parts per million to about 200 parts per million of dihexylamine, and
   (e) sufficient fumed silica treated with cyclopolysiloxanes or silazanes to provide reinforcement.

18. The composition of claim 17, wherein the silanol-terminated polydiorganosiloxane has the general formula

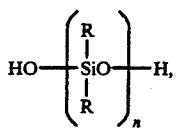

wherein R is independently selected from the group consisting of monovalent hydrocarbon radicals, halogenated monovalent hydrocarbon radicals and cyanoalkyl radicals, and n is an integer of at least 5.

19. The composition of claim 18 wherein the acyloxy-terminated polydiorganosiloxane has a viscosity of from about 100 centipoise to about 500,000 centipoise at 25° C.

20. The composition of claim 18 wherein the silanol-terminated polydiorganosiloxane has a viscosity of from about 2500 centipoise to about 100,000 centipoise at 25° C.

21. The composition of claim 18 wherein the silanol-terminated polydiorganosiloxane has a viscosity of from about 10,000 centipoise to about 50,000 centipoise at 25° C.

22. The composition of claim 17, wherein the polyacyloxysilane has the general formula

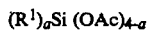

wherein Ac is a saturated aliphatic monoacyl radical, $R^1$ is independently selected from the group consisting of monovalent hydrocarbon radicals, halogenated monovalent hydrocarbon radicals and cyanoalkyl radicals, and a equals 0 or 1.

23. The composition of claim 17, wherein the condensation catalyst is a carboxylic acid salt of a metal selected from the group consisting of lead, tin, nickel, cobalt, iron, cadium, chromium, zinc, and manganese.

24. The composition of claim 23, wherein the metal is tin.

25. The composition of claim 24, wherein the condensation catalyst is present in an amount of from about 0.01 percent by weight to about 2.0 percent by weight, based on the weight of silanol-terminated polydiorganosiloxane.

26. The composition of claim 17 wherein the amine is present in an amount greater than about 40 parts per million, based on the weight of silanol-terminated polydiorganosiloxane.

27. The composition of claim 17, wherein the amine is present in an amount greater than about 75 parts per million, based on the weight of silanol-terminated polydiorganosiloxane.

28. The composition of claim 17 wherein the amine is present in an amount of from about 100 parts per million to about 200 parts per million, based on the weight of silanolterminated polydiorganosiloxane.

29. A method for making a self-leveling, curable composition, consisting essentially of
I. anhydrously mixing
(a) an silanol-terminated polydiorganosiloxane,
(b) at least about one mole of polyacyloxysilane per mole of silicon-bonded hydroxyl groups in (a),
(c) an effective amount of metal-containing condensation catalyst,
(d) from about 25 parts per million to about 200 parts per million of dihexylamine, and
(e) sufficient fumed silica treated with cyclopolysiloxanes or silazanes to provide reinforcement.

30. The method of claim 29 wherein the silanol-terminated polydiorganosiloxane has the general formula

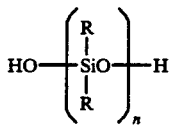

wherein R is independently selected from the group consisting of monovalent hydrocarbon radicals, halogenated monovalent hydrocarbon radicals and cyanoalkyl radicals, and n is an integer of at least 5.

31. The method of claim 30 wherein the silanol-terminated polydiorganosiloxane has a viscosity of from about 100 centipoise to about 500,000 centipoise at 25° C.

32. The method of claim 29, wherein the amine is present in an amount greater than about 40 parts per million, based on the weight of silanol-terminated polydiorganosiloxane.

33. The method of claim 29 wherein the amine is present in an amount greater than about 75 parts per million, based on the weight of silanol-terminated polydiorganosiloxane.

* * * * *